INVENTOR.
ORVILLE L. SCHAEFER
BY Arnold E. Renner
ATTORNEY

March 25, 1969 O. L. SCHAEFER 3,435,427

MAGNETIC MEMORY SYSTEM FOR THE STORAGE OF DIGITAL INFORMATION

Filed Oct. 23, 1963 Sheet 2 of 2

INVENTOR.
ORVILLE L. SCHAEFER

BY

ATTORNEY

United States Patent Office 3,435,427

Patented Mar. 25, 1969

3,435,427

MAGNETIC MEMORY SYSTEM FOR THE STORAGE OF DIGITAL INFORMATION

Orville L. Schaefer, Phoenix, Ariz., assignor to General Electric Company, a corporation of New York Filed Oct. 23, 1963, Ser. No. 318,219

Int. Cl. G11b *5/62;* G11c *11/48*

U.S. Cl. 340—174 12 Claims

ABSTRACT OF THE DISCLOSURE

A coincident current memory system is disclosed which includes an inhibit winding comprising a plurality of parallel segments. Voltage pulses of relatively opposite polarity are provided to alternate segments to cancel or to prevent capacitive coupling in the sense winding.

The present invention relates to a system for the storage of digital information by magnetic means and more particularly to a memory system of the coincident current type.

In many applications, including electrical data processing apparatus, there is utilized a storage means which may be comprised of a plurality of storage elements of ferromagnetic material. These magnetic storage elements are typified by their having a substantially rectangular hysteresis characteristic with large residual flux characteristics when the storage element is switched into one condition or other. Because of these characteristics of hysteresis and residual flux, magnetic elements are particularly adapted to the storage of binary information therein. Each of these elements is capable of storing one digit, or bit, of binary information. In order to store a large number of bits of information, it is customary in the art to provide a planar matrix of magnetic elements in which the elements are arranged so as to provide a series of intersecting linear rows and columns. A plurality of these planar matrices may then be positioned one atop the other to form a three dimensional storage array. As is common in the art, a plurality of electrical conductors are placed in an operative relationship, by being magnetically coupled, with each of the magnetic elements to effect a change in the magnetic state of selected ones of the elements. This change in the magnetic state is occasioned when there is a predetermined coincidence of electrical currents through certain prescribed conductors associated with a selected element.

Magnetic storage arrays of this type are well known in the art and it is a practice in certain of these arrays to have each of the magnetic elements magnetically coupled to four separate windings or electrical conductors. These four separate conductors are conveniently and commonly designated as the X drive winding, the Y drive winding, the inhibit winding, and the sense winding. These various conductors or windings are illustrated in FIG. 1 and will be explained in greater detail later. Suffice to say at the present time that the inhibit winding and the sense winding both are positioned in magnetic relationship with all of the magnetic elements of one particular planar matrix. Additionally, although the inhibit winding is operational only during the write period of the array and the sense winding is operational only during the read period of the array, there does exist a certain amount of coupling between these two windings, which is primarily capacitive in nature, and effects from the electrical energization of the inhibit winding may exist in the sense winding during the read period under particular circumstances. This is particularly true as the use speed of the memory array increases and is objectionable in that residual currents coupled from the inhibit winding to the sense winding may result in that latter winding having a false signal.

In elaboration of the last statement, it may be said that at slower speeds any currents so coupled to the sense winding will have sufficient time to decay prior to the reading operation. However, in the case of high speed memories, the time lapse between the write operation and the read operation may be insufficient in duration to permit adequate decay. Thus, currents coupled from the inhibit winding to the sense winding during the write operation may still be present during the read operation and appear to the output of the sense winding as a signal.

It is, therefore, an object of this invention to provide an improved memory system.

Another object is to provide improved means for the utilization of magnetic storage means.

Still another object is to provide means for the rendering ineffective certain unwanted currents during the use of magnetic storage means.

A still further object is to provide a magnetic memory system of the coincident current type in which currents occasioned in one winding by the current in a second winding are minimized in effect.

Briefly stated, the present invention provides a magnetic memory system including a matrix comprising a plurality of discrete magnetizable elements, for example toroidal cores, each of which is capable of two stable states of magnetization. Each of the elements is magnetically coupled with a plurality of electrical conductors. Included within these conductors are a sense winding and an inhibit winding formed in a mutually transverse relationship so as to cross one another at a plurality of points. The inhibit winding, which in its entirety is magnetically coupled to all of the elements of the matrix, is divided into a plurality of parts or segments each of which is magnetically coupled to a portion of the elements of the matrix. Each part or segment of the inhibit winding is connected at one end thereof to a suitable reference potential. The other ends of the inhibit winding segments are connected to suitable voltage pulse sources. Two such voltage sources are provided which, with respect to each other, provide relatively positive and negative going pulses. One half of the segments are connected to one of these voltage sources and the other half is connected to the other voltage source. The various segments of the inhibit winding are positioned within the matrix in an alternant manner. That is, each crossing point of the sense winding and an inhibit winding segment connected to a first of the voltage sources is adjacent a crossing point of the sense winding and an inhibit winding segment connected to the second of the voltage sources. This configuration renders any undesirable currents coupled to the sense winding from the inhibit winding ineffective and hence not detectable at the output of the sense winding.

Further objects and advantages of the invention will become apparent as the following description proceeds and features of novelty which characterize the invention will be pointed out in particularity in the claims annexed to and forming a part of this specification. For a better understanding of the present invention, reference is made to the accompanying drawings in which:

Figure 1:
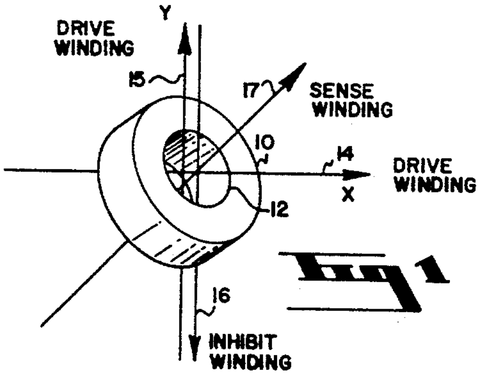
FIG. 1 is a schematic illustration of a single magnetic element, in one possible form, showing its relationship to the various windings of the memory system array.

With reference now to FIG. 1, there is shown a toroidal core 10, having a central aperture 12, which may be utilized as a bistable storage element in the implementation of the present invention. The core 10 is made of any suitable feromagnetic material, for example certain ferrites. This core has a substantially rectangular hysteresis characteristic or loop and a large residual magnetism, see FIG. 2.

Figure 2:
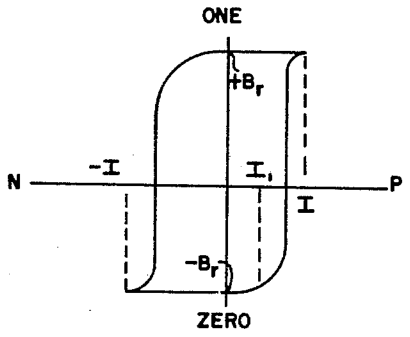
FIG. 2 is a graph illustrating the hysteresis loop of the loop of the magnetic element of FIG. 1.

In the core hysteresis loop of FIG. 2 the abscissa represents current, or magnetizing force, with positive current to the right. The ordinate represents the magnetic field induced in the core. If a magnetizing force provided by a positive current greater than I is impressed upon the core, the core will saturate in a direction denoted as positive magnetic saturation. After removal of the saturating current, the core will retain the $+B_r$ residual magnetic field. A core so magnetized is said to be in the 1-state. After a core is magnetized to saturation in the negative direction by a negative current greater in magnitude than —I, and the magnetizing force is removed, the core will retain a magnetic field of $-B_r$, which is designated as the 0-state of magnetism in the core.

Assume, first, that the core is in the 0-state, and that a positive current $I_1$ is applied thereto as a magnetizing force. This current is not sufficient to transfer the magnetic field of the core beyond the negative knee of the hysteresis loop, so that when the current $I_1$ is removed, the magnetic field in the core will remain at the $-B_r$ value and the core will remain in the 0-state. Assume, now, that a current equal to $2 \times I_1$ is applied as a magnetizing force to the core, where $2I_1 > I$. This constitutes a positive saturating current for the core, and it will saturate in the positive direction, so that when the magnetizing force is removed, the core will remain in the 1-state. Therefore, by simultaneous application of two currents, each equal to $I_1$, and each alone incapable of changing the state of the core, but which together are greater than I, the core is transferred from the 0-state of the 1-state. Similarly, if the core is in the 1-state, the simultaneous application of two currents, each equal to $-I_1$, will transfer the core to the 0-state.

Four electrical conductors which act as one-turn windings thread each core (FIG. 1): an X drive winding 14, a Y drive winding 15, an inhibit winding 16, and a sense winding 17. When energized, the X drive winding and the Y drive winding each carry a current having a magnitude equal to $I_1$. Therefore, if both the X drive winding and the Y drive winding of a given core are simultaneously energized with currents providing aiding magnetizing forces, the core receives a saturating magnetizing field and will change state if it is not already in the state directed by this field. The sense winding responds to changes in state of the core to detect the bit value that is stored therein. The inhibit winding, when energized, carries a current having a magnitude approximately equal to $I_1$ and prevents the transfer of the core from one state to another, by providing a magnetizing force opposing that produced by the X and Y drive windings.

For a more complete description of a memory system such as has been briefly described, reference is made to chapter 8 of Digital Computer Components and Circuits by R. K. Richards (D. Van Nostrand Company, Inc., 1959).

In the prior art systems, it has been common that the sense and inhibit windings are both unitary windings magnetically coupled with all of the cores 10 of a particular planar matrix. It is customary for the sense winding to pass diagonally through the columns and rows of the planar matrix to connect each core. The prior art method of forming an inhibit winding has been to start at one corner of the planar matrix and to link each of the cores in a particular column or row before going sequentially to a next column or row. Thus, in the prior art, it is common for the inhibit winding to start at one corner of a planar matrix, to then be sequentially disposed in a magnetic relationship with each of the magnetic elements on a column by column or row by row basis, and to terminate at a second corner of the planar matrix. The sense winding in these prior art matrices lies in a plane which is parallel to and substantially the same as the plane of the inhibit winding. It, like the inhibit winding, is in a magnetic relationship with each of the cores in a particular planar matrix.

While a large number of configurations have been devised for the sense winding, these normally link each of the magnetic elements in a manner while provides that the sense winding runs in a direction which is transverse to the direction of the inhibit winding. Because the inhibit winding and sense winding lie in essentially the same plane, there is existing between these two windings a relatively large amount of coupling which is largely capacitive in nature; and, because this coupling is essentially all in the same direction, there is coupled to the sense winding an electrical signal which may be mistaken for a signal produced by a binary bit in one of the magnetic elements. In slower speed memory systems this coupled signal has sufficient time to decay between the write and the read operations and is, therefore, not particularly objectionable. As the speed of these memory systems becomes increasingly faster, the time available for this false signal to decay in the sense winding is greatly reduced and hence the chances for an error are increasingly present.

Figure 3:
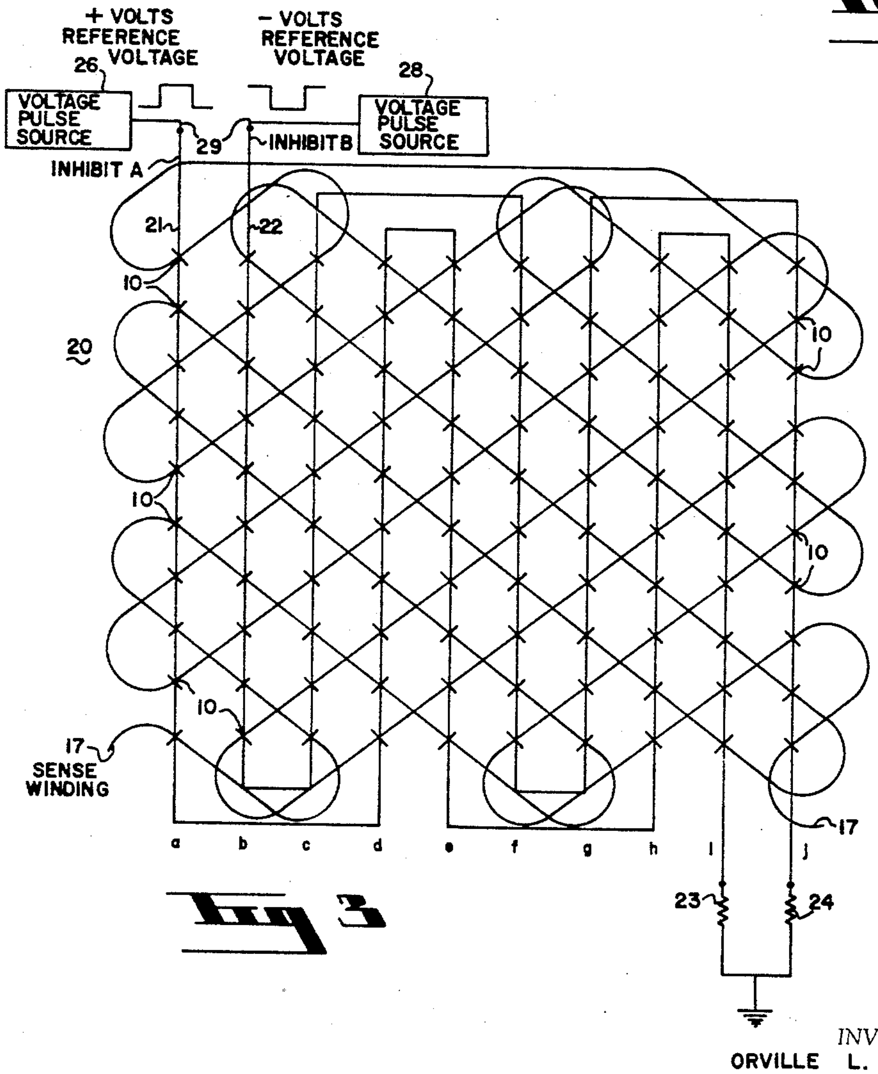
FIG. 3 is a schematic illustration showing a planar matrix of magnetic cores, including an inhibit winding constructed in accordance with a first embodiment of the present invention.

With reference now to FIG. 3, there is shown a planar magnetic core matrix 20 which embodies an inhibit winding of the present invention. In the embodiment shown in FIG. 3, the matrix 20 includes a plurality of discrete magnetic cores 10 disposed so as to form a plurality of columns and rows all lying in substantially the same plane. While the matrix illustrated in FIG. 3 is shown to be a 10 x 10 matrix, it is expressly understood that this is only illustrative and that the matrix may include, in either direction, any suitable number of magnetic cores in accordance with requirements of the system in which it is to be utilized. A sense winding 17 successively links each of the magnetic elements in the matrix 20. The sense winding 17 may be of any known configuration and in the illustrated embodiment crosses, in a magnetic relationship with the cores 10, diagonally the columns and rows of the matrix 20.

In accordance with the present invention, the inhibit winding is divided into a plurality of segments. In the FIG. 3 illustration, the inhibit winding is divided into two segments 21 and 22, denoted respectively as Inhibit A and Inhibit B. These two segments, Inhibit A and Inhibit B, are positioned within the planar matrix 20 in a substantially mutually parallel configuration and it is seen that each of the elements 10 is in an operative relationship with one or the other of the segments. In FIG. 3, the two inhibit winding segments are shown disposed within the matrix on a column by column basis and for purposes of this description the columns are designated as a through *j*. Inhibit A segment enters the matrix at one corner thereof and after passing downwardly through the elements 10 of column *a* is then formed to pass through the elements of column *d* in the upwardly direction, then downwardly through the elements in column *e*, upwardly through the elements of column *h* and downwardly through the elements of column *i*. The second segment, Inhibit B, is shown to enter the matrix at the column immediately adjacent to where Inhibit A entered and passes progressively downwardly through column *b* elements, upwardly through column *c* elements, downwardly through column *f* elements, upwardly through column *g* and downwardly through column *j* so as to terminate adjacently to the termination of Inhibit A. Each of the segments, Inhibit A and Inhibit B, is electrically continuous throughout all of its passes through the columns of the matrix.

The two segments, Inhibit A and Inhibit B, each have one terminal thereof connected to a suitable reference potential. As illustrated in FIG. 3, the segments Inhibit A and Inhibit B are each connected to ground through resistors 23 and 24 respectively. These resistors serve primarily as current limiting resistors. At the opposite or input terminals of the two inhibit winding segments, each segment is connected to a voltage pulse source. In FIG. 3 Inhibit A is connected to a voltage pulse source 26 while Inhibit B is connected to a voltage pulse source 28. The two segments are connected to their respective voltage pulse sources by suitable electrical conductor means 29.

The pulse sources 26 and 28 may be of any suitable type known in the art, for example, any of those sources of the type customarily utilized for pulsing prior art inhibit windings. In the illustrated embodiment, the source 26 is designated as providing a positive going square pulse while the source 28 is designated as providing a negative going square pulse. The aforementioned pulses of the two sources 26 and 28 are relatively positive going and negative going and not necessarily positive and negative going from the standpoint of ground reference. Furthermore, it is not necessary that the inhibit winding segments be connected to a common reference potential as is illustrated. With respect to the last statement, in a particular application of the present invention, segment Inhibit A was connected to a reference potential of 0 volt and its source 26 provided a pulse which went from 0 volt to +30 volts. The second segment, Inhibit B, was connected to a reference potential of +30 volts and its source 28 provided a pulse which went from +30 volts to 0 volt. It is, however, desirable that the deviation from the utilized reference voltage in each direction by the two sources 26 and 28 be substantially equal in magnitude although opposite in direction.

At the time when it is desired to energize the inhibit winding segments, each of the sources 26 and 28 are actuated so that the respective positive going and negative going voltage pulses are applied simultaneously to each of the segments Inhibit A and Inhibit B. With the voltage pulses applied to the inhibit winding segments as illustrated in the FIG. 3 configuration, current will flow, in Inhibit A segment, downwardly through column *a*, upwardly through column *d*, downwardly through column *e*, upwardly through column *h* and downwardly through column *j*. In the Inhibit B segment, the current will flow upwardly through column *b*, downwardly through column *c*, upwardly through column *f*, downwardly through column *g* and upwardly through column *i*.

As has been previously stated, prior art inhibit windings successively link the magnetic elements of a matrix on a column by column basis. Such a winding would enter the matrix at a first corner, for example, at the same place as does the Inbihit A segment of the FIG. 3 illustration. This prior art winding would then progress downwardly through column *a*, upwardly through column *b*, downwardly through column *c* and so on until the entire matrix was wound and the winding terminated at a second corner of the matrix. If the exit terminal of this winding is now connected to ground and a positive voltage pulse applied to the other end of the winding, current will flow in the winding downwardly through column *a*, upwardly through column *b*, downwardly through column *c*, etc.

Comparing the direction of current in the inhibit winding configuration of the present invention and in that of the prior art, it is seen that in each case the direction of current within each of the various columns is the same. Thus, the directional relationship of currents in the X and Y drive windings and the inhibit winding for changing the magnetic state of the magnetic elements is maintained by the present invention.

Figure 4:
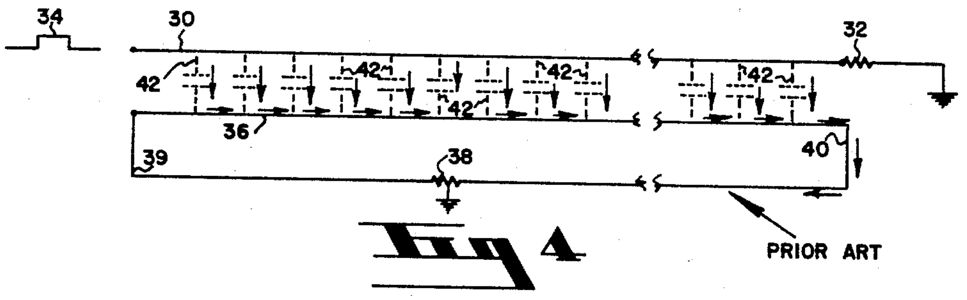
FIG. 4 is a schematic drawing illustrating the electrical relationship between the sense and inhibit windings of prior art devices.
Figure 5:
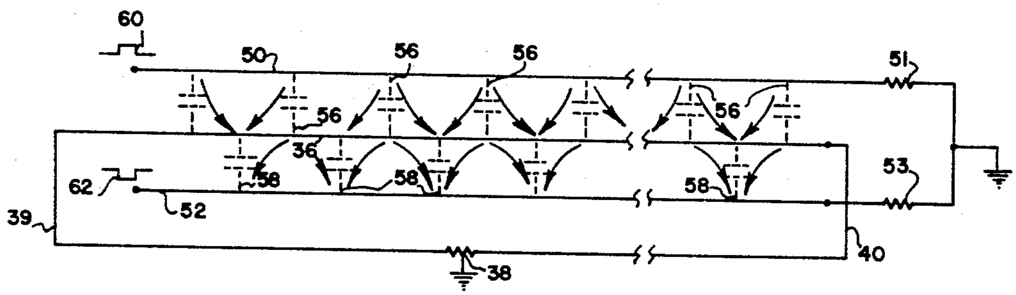
FIG. 5 is a schematic drawing illustrating the electrical relationship between the sense and inhibit winding of the present invention.

The major advantage of the present invention over prior art structures may best be understood with respect to FIGS. 4 and 5. FIG. 4 illustrates the electrical relationship between the sense and inhibit windings of prior art configurations. FIG. 5 illustrates this same relationship with respect to the present invention.

In FIG. 4 the inhibit winding is represented by line 30 which has one end thereof connected to ground via a resistor 32. Through any suitable source means, a positive going voltage pulse 34 is applied to the other end of the line 30. Line 36 in FIG. 4 represents the sense winding. Connected in series with the line 36, by means of electrical conductors 39 and 40, is a grounded center resistor 38 which represents a means for utilizing signals coupled to the sense winding during the read operation. The coupling between the inhibit and sense windings exists primarily at the crossing points of these two windings in the matrix (FIG. 3) and is represented in FIG. 4 by a plurality of capacitors 42 (shown dotted) connected in parallel between the lines 30 and 36. When the positive pulse 34 is applied to line 30 (the inhibit winding), the capacitors 42 will charge. The charge on each of the capacitors 42 will be transferred to line 36 (the sense winding) and will cause currents (illustrated by the arrows in FIG. 4) to be present in that line. These currents will tend to be cumulative and may, collectively, be of sufficient magnitude to appear to the output utilization means (resistor 38) as a signal representing a stored binary bit in one of the cores of the system.

FIG. 5 represents the electrical relationship existing between the sense winding and the inhibit winding in accordance with the present invention. As in FIG. 4, the sense winding is represented by line 36 which is connected by conductors 39 and 40 to a grounded resistor 38 which again represents a means for utilizing signals coupled to the sense winding during the read operation. The inhibit winding of the present invention is here represented by lines 50 and 52. Each of the lines 50 and 52 represents an inhibit winding segment. One end of each of the lines 50 and 52 is connected to ground via respective resistors 51 and 53. As before, the coupling existing between the sense and the inhibit windings is primarily at the crossing points of these two windings and may be represented by a plurality of capacitors. In FIG. 5, a first plurality of capacitors 56 (shown dotted) couple line 50 to line 36 and a second plurality of capacitors 58 (also shown dotted) couple line 52 to line 36.

The cancellation effect of the relatively oppositely going pulses 60 and 62 may also be considered, perhaps more accurately with respect to electron flow theory, as transferring a capacitively induced charge from a winding of higher potential to a winding of lower potential. This may be illustrated with reference to FIGS. 4 and 5. As was the case with the FIG. 4 configuration, charges will be coupled to line 36 (the sense winding). However, in the present situation, as is illustrated by the arrows in FIG. 5, the charge does not remain on the sense winding but is instead transferred to the inhibit winding segment of lower potential. In the FIG. 5 illustration, charge transfer, or current, will be from line 50, through a capacitor 56, along a small length of the sense winding (line 36) and through a capacitor 58 to line 52. Thus, the net charge coupled to the sense winding from the inhibit winding remains substantially zero and there is, therefore, no charge coupled from the inhibit winding which can effect a current in the sense winding which is detectable by the means represented by resistor 38.

Figure 6:
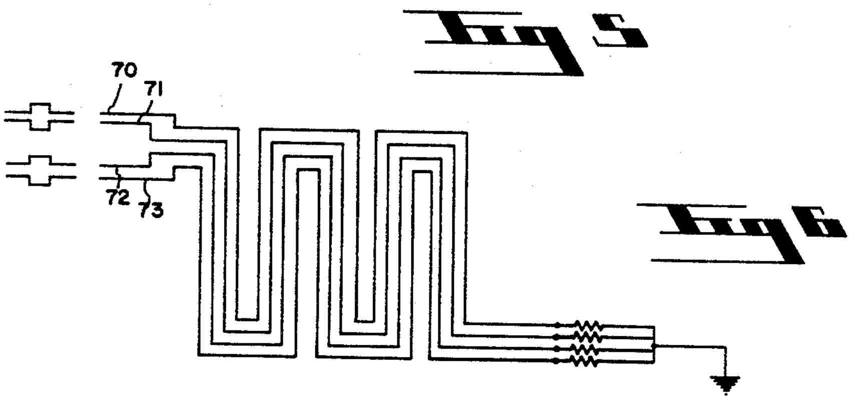
FIGS. 6 and 7 are diagrammatic illustrations of modifications of the inhibit winding illustrated in FIG. 3.
Figure 7:
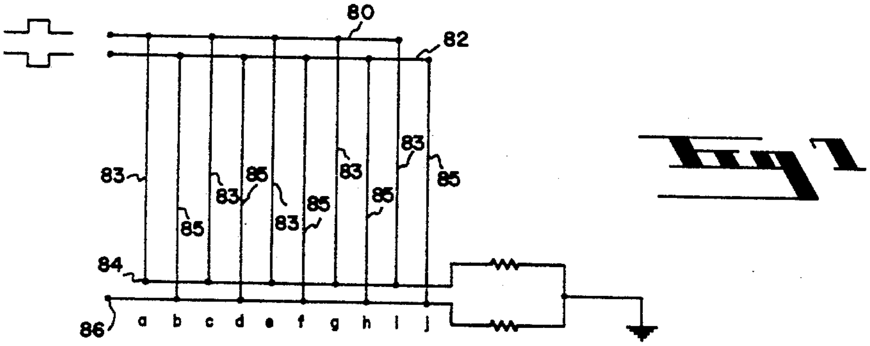

FIGS. 6 and 7 illustrate two possible modifications of the inhibit winding in accordance with the present invention. In these figures the cores 10, the sense winding, and the X and Y drive windings have been omitted for the sake of simplicity and only the general configuration of the inhibit winding has been shown. FIG. 6 differs from the embodiment of FIG. 3 in that four substantially mutually parallel segments 70, 71, 72, and 73 are utilized. As in the case of FIG. 3 the utilization of the embodiment of FIG. 6 would provide that alternate segments of the inhibit winding are respectively provided with positive going and negative going pulses. For example, the pulses applied to segments 70 and 72 might be positive going while those applied to segments 71 and 72 negative going. An analysis of the FIG. 6 configuration shows that the same electrical relationships, with respect to the sense and X and Y drive windings, hold true for this embodiment as with the embodiment of FIG. 3.

The FIG. 7 illustrates another possible embodiment of an inhibit winding configuration in accordance with the present invention. In this embodiment there is provided, along one side of the matrix, a first bus 80 and a second bus 82 which are connected respectively to relatively positive and negative going voltage pulse sources. At the opposite side of the matrix there are provided two additional buses 84 and 86 corresponding respectively to the two buses 80 and 82 to form bus pairs 80–84 and 82–86. Interconnecting each of these bus pairs are a plurality of segments 83 and 85 which are in an operative relationship with the core columns of the matrix. That is, segments 83, connecting buses 80 and 84, are alternated with segments 85 connecting buses 82 and 86, throughout the matrix to provide, in essence, the same electrical relationships as were provided with the other two embodiments of the present invention.

From the foregoing it is seen that there has been described a memory core system utilizing an inhibit winding which is easily and readily manufactured and which renders the undesirable coupling between the inhibit and sense windings ineffective.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. As an example, the invention is not limited to magnetic cores as illustrated but would have equal application to other bistable magnetic storage devices such as thin films. The appended claims are therefore intended to cover and embrace any such modifications, within the limits only of the true spirit and scope of the invention.

What is claimed is:

1. A memory system comprising an array of elements each capable of a plurality of stable states of magnetization, means for determining which of the stable states each of said elements is to occupy including inhibit winding means operatively associated with each of said elements, said inhibit winding means comprised of at least two segments, and means for simultaneously supplying relatively positive and negative polarity voltage pulses respectively to alternate segments of said inhibit winding, said segments positioned with respect to said elements such that each of the elements associated with a segment to which is supplied a relatively positive going voltage pulse is adjacent a second element which is associated with a segment to which is supplied a relatively negative going pulse.

2. A magnetic memory system comprising a planar matrix of discrete magnetizable elements each capable of two stable states of magnetization, means for determining which of the stable states each of said elements is to occupy including inhibit winding means operatively associated with said elements, said inhibit winding means comprised of at least two segments wound in substantially parallel fashion throughout said planar matrix, a first voltage source for the production of a voltage pulse, a second voltage source for the production of a voltage pulse which is of relatively opposite polarity with respect to that of said first voltage source and means connecting the segments of said inhibit winding alternately to said first and second voltage sources.

3. A magnetic memory system comprising a planar matrix of discrete magnetizable elements each capable of two stable states of magnetization, means for determining which of the stable states each of said elements is to occupy including first and second drive windings and an inhibit winding operatively associated with each of said elements, said inhibit winding comprised of at least two segments disposed in substantially mutually parallel fashion throughout said planar matrix, and means for supplying voltage pulses of relatively opposite polarity to alternate segments of said inhibit winding.

4. A magnetic memory system comprising a plurality of discrete magnetizable elements each capable of two stable states of magnetization, said elements disposed in a planar array so as to provide a plurality of intersecting columns and rows, means for determining which of the stable states each of said elements is to occupy including an inhibit winding magnetically coupled to each of said elements, said inhibit winding comprising a plurality of segments positioned such that each of said segments is in an operative relationship with a number of said elements, and voltage pulse means comprising at least two voltage sources connected to said segments, said voltage pulse means operative to supply pulses of relatively opposite going polarity to alternate segments of said inhibit winding.

5. In a magnetic memory system of the type including a matrix of discrete magnetizable elements capable of two stable states of magnetization, and means for determining which of the stable states each of said elements is to occupy, an inhibit winding operatively associated with each of said elements, said inhibit winding comprised of first and second segments wound in substantially parallel fashion throughout said matrix, and means for supplying voltage pulses of relatively opposite polarity to alternate segments of said inhibit winding.

6. A memory system comprising a matrix of magnetizable elements each capable of two stable states of magnetization, means for determining which of the stable states each of said elements is to occupy including inhibit winding means operatively associated with each of said elements, said inhibit winding comprising a plurality of segments disposed in a substantially parallel configuration throughout said matrix, additional winding means disposed in an operative relationship with said elements, said additional winding means transversely positioned with respect to said inhibit winding segments to thereby form a plurality of crossing points with said inhibit winding segments, and means for simultaneously supplying voltage pulses of relatively opposite polarity to alternate segments of said inhibit winding whereby a first of said crossing points is adjacent a second of said crossing points inclusive of a segment of said inhibit winding to which is supplied a voltage pulse of relatively opposite polarity with respect to said first crossing point.

7. A memory system comprising a planar matrix of magnetizable elements capable of two stable states of magnetization, said elements arranged so as to form a plurality of intersecting columns and rows, means for determining which of said stable states each of said elements is to occupy including inhibit winding means operatively associated with each of said elements, said inhibit winding comprising a plurality of segments wound in substantially parallel fashion throughout said planar matrix, additional winding means disposed in an operative relationship with said elements, transversely positioned with respect to said inhibit winding segments and said columns and rows whereby said inhibit winding and said additional winding means cross at a plurality of points, and means for simultaneously supplying relatively positive and negative polarity voltage pulses respectively to alternate segments of said inhibit winding whereby the voltage of an inhibit winding segment, at a first point of crossing, is of relatively opposite polarity to the voltage of the inhibit winding segment at a second point of crossing, said first and second points of crossing being positioned in close proximity to one another.

8. A memory system comprising a matrix of magnetizable elements each capable of two stable states of magnetization, means for determining which of the stable states each of said elements is to occupy including an inhibit winding comprised of a plurality of segments disposed in a substantially mutually parallel fashion throughout said matrix of segments, said determining means disposed in an operative relationship with said elements, additional winding means operatively associated with said elements positioned transversely and capacitively coupled to said segments, and means for simultaneously supplying voltage pulses of relatively opposite polarity to alternate segments of said inhibit winding.

9. A memory system comprising a plurality of magnetic elements each capable of two stable states of magnetization, said elements arranged to form a matrix comprised of a plurality of linear columns of said elements, means including an inhibit winding for determining which of said stable states each of said elements is to occupy, said inhibit winding comprising first and second pluralities of electrical conductors, said conductors of said first plurality being magnetically coupled to alternate columns of said elements and said conductors of said second plurality being magnetically coupled to the remaining columns of said elements, and first and second voltage pulse sources connected respectively to said first and second pluralities of conductors, said first and second voltage pulse sources providing voltage pulses of relatively opposite going direction.

10. A memory system comprising a plurality of magnetic elements each capable of two stable states of magnetization, said elements arranged to form a matrix comprised of a plurality of linear columns of said elements, means including an inhibit winding for determining which of said stable states each of said elements is to occupy, said inhibit winding comprising first and second pluralities of electrical conductors, said conductors of said first plurality being magnetically coupled to the elements in alternate columns and said conductors of said second plurality being magnetically coupled to the elements of the remaining columns, and first and second voltage pulse sources connected respectively to said first and second pluralities of conductors, said first voltage pulse source providing a voltage pulse of a predetermined magnitude and direction and said second voltage pulse source providing a voltage pulse of substantially equal magnitude but of opposite direction with respect to said voltage pulse of said first source.

11. A memory system comprising a plurality of magnetic elements each capable of two stable states of magnetization, said elements arranged to form a matrix comprised of a plurality of linear columns of said elements, means including an inhibit winding for determining which of said stable states each of said elements is to occupy, said inhibit winding comprised of first and second segments, said first segment being magnetically coupled to alternate columns of said elements and said second segment being magnetically coupled to the remaining columns of said elements, and first and second voltage pulse sources connected respectively to said first and second segments, said first and second voltage pulse sources providing voltage pulses of relatively opposite going direction.

12. A magnetic core memory comprising a plurality of magnetic cores each capable of two stable states of magnetization, said cores disposed in a planar matrix comprised of a plurality of columns of said cores, and means including an inhibit winding magnetically coupled to each of said cores, said inhibit winding comprised of first and second continuous segments connected respectively to first and second voltage sources, said first and second voltage sources providing relatively positive and negative going voltage pulses respectively to said first and second segments, said first segment disposed in a magnetic relationship with alternate ones of said columns of cores and said second segment disposed in a magnetic relationship with the remaining of said columns of cores.

References Cited

UNITED STATES PATENTS

| | | | |
|---|---|---|---|
| 3,329,940 | 7/1967 | Barnes et al. | 340—174 |
| 3,339,186 | 8/1967 | Cohen | 340—174 |
| 2,911,631 | 11/1959 | Warren | 340—174 |
| 3,110,017 | 11/1963 | Thornton | 340—174 |
| 3,111,580 | 11/1963 | Keefer | 340—174 |
| 3,126,529 | 3/1964 | Hempel | 340—174 |
| 3,161,860 | 12/1964 | Grooteboer | 340—174 |

STANLEY M. URYNOWICZ, Jr., *Primary Examiner.*